Patented Feb. 2, 1954

2,668,137

UNITED STATES PATENT OFFICE 2,668,137

VITAMIN $B_{12}$ ELUTION FROM CHARCOAL

Stanford W. Briggs, Westfield, Robert G. Denkewalter, Plainfield, and George B. Hughey, Metuchen, N. J., assignors to Merck & Co., Inc., Rahway, N. J., a corporation of New Jersey No Drawing. Application December 13, 1949, Serial No. 132,804

9 Claims. (Cl. 167—81)

This invention relates to new and improved procedures for obtaining concentrates containing vitamin $B_{12}$ associated with other LLD and APF active substances and particularly to such procedures wherein the concentrate obtained is highly purified and constitutes a new crystalline complex of vitamin $B_{12}$ and the associated LLD and APF active substances.

Prior to our invention or discovery, concentrates containing vitamin $B_{12}$ have been obtained from various sources such as liver extracts and fermentation broths obtained by the propagation of suitable microorganisms such, for example, as strains of Streptomyces griseus. One of the most useful methods for obtaining such concentrates has been to treat an aqueous solution containing vitamin $B_{12}$ and other LLD and APF active substances, as for example, a fermentation broth of the type described with an adsorbent such as activated charcoal followed by elution of adsorbed material with solvents such as mixtures of water with methanol, ethanol or pyridine. From such eluates, vitamin $B_{12}$ has been obtained in highly concentrated and substantially pure form. It has been found that the greater portion of the activity, often in excess of 90% of the activity exhibited by the starting solution, is lost during the steps of adsorption, elution and recovery from eluates.

We have now discovered a new procedure for eluting vitamin $B_{12}$ active substances, i. e. vitamin $B_{12}$ and other LLD and APF active substances, from charcoal which involves the use of a two-phase aqueous-organic eluting solvent and which results in a several-fold increase in the amount of vitamin $B_{12}$ which can be directly recovered. The process at the same time provides recovery of increased amounts of other LLD and APF active substances which are apparently closely related to vitamin $B_{12}$ and which actually form a crystalline complex with vitamin $B_{12}$ when the recovered concentrates are sufficiently purified. The recovery of increased amounts of these related LLD and APF active substances together with the increased amounts of vitamin $B_{12}$ is of primary significance in view of the discovery by our colleagues Wolf, Kaczka and Kuehl that the related vitamin $B_{12}$-like substances having LLD and APF activity can be converted to additional amounts of vitamin $B_{12}$ by reaction with a source of cyanide ion, as for example, hydrocyanic acid or ionizable salts of hydrocyanic acid. This conversion of vitamin $B_{12}$-like materials to additional quantities of vitamin $B_{12}$ is more fully disclosed and claimed in an application of Wolf, Kaczka, and Kuehl, Serial No. 127,519, filed November 15, 1949 (now abandoned) and continuation-in-part thereof Serial No. 179,392, filed August 14, 1950, now abandoned, and the process is of extreme importance not only because of the increased yields of vitamin $B_{12}$ which are made possible, but also because the process can be carried out directly with mixtures of vitamin $B_{12}$ and the related vitamin $B_{12}$-like substances thereby avoiding the difficulties normally experienced in separating pure vitamin $B_{12}$ from such materials.

In carrying out the process of the present invention, a solution containing vitamin $B_{12}$ and other LLD and APF active substances, as for example, a fermentation broth obtained by the propagation of strains of the organism S. griseus is treated in the usual manner with activated charcoal to adsorb the vitamin $B_{12}$ and other active substances on the charcoal. The adsorbed materials are then eluted with a two-phase system of water and an organic polar solvent that is not completely miscible with water. From the resulting eluate the active substances can be recovered in various ways. For example, the active substances can be transferred to a solvent suitable for chromatography and subjected to at least one and preferably two chromatographic purification treatments on a column of alumina. The effluent solution can be treated directly with a source of cyanide ion in the manner above described to convert the vitamin $B_{12}$-like materials contained therein to additional vitamin $B_{12}$, or alternatively the effluent solution can be subjected to further purification as more fully hereinafter described to obtain a new crystalline complex of vitamin $B_{12}$ and the related LLD and APF active substances.

As eluting solvent in our improved process, mixtures of water with any of a large number of organic polar solvents which are not completely miscible with water can be employed. The solvent should be one which is essentially immiscible with water so that 1:1 mixtures of water and the solvent result in a two-phase system.

It should be noted in this connection, however, that variations in the amount of water and solvent employed in the mixture can be made, the important feature being that the solvent mixture employed in elution be a two-phase system rather than a single phase, such for example as water saturated with a partially miscible organic solvent. A number of organic polar solvents which have been found to be satisfactory for use in our process include aliphatic alcohols containing more than three carbon atoms and particularly normally, secondary and iso-butyl alcohol (tertiary-butyl alcohol is infinitely soluble in water and thus not suitable for use in the new process), the amyl alcohols, the hexyl alcohols and the octyl alcohols, ketones such as methyl ethyl ketone and methyl isobutyl ketone, aralkyl alcohols such as benzyl alcohol, esters such as amyl acetate, and aryl alcohols such as cresol. The solvents considered most suitable for use in the process on the basis of recovery of active material and general advantages in operation are the butyl alcohols, the amyl alcohols and benzyl alcohol.

In the two-phase elution with water and an organic solvent, it is required that sufficient organic solvent be present to saturate the preferential adsorptive capacity of the charcoal for the organic solvent. This amounts to about 0.2 cc. of butanol, for example, per one gram of carbon. Further than this, it is advantageous to use a large excess of the organic solvent since this allows for a reduction in the amount of aqueous phase used. (This results from the fact that a certain minimum quantity of liquid must be used in order mechanically to handle the carbon; use of large amounts of organic liquid allow the employment of correspondingly lesser amounts of water.)

The amount of aqueous phase used must be sufficiently larger in volume than the volume of carbon present so that the entrainment loss of small amounts of the aqueous phase in the carbon cake during filtration will not result in serious loss of product. In addition, however, the water volume must be sufficient to recover all the active material from the carbon and the solvent phase. This amount is best determined by experiment; the amounts of solvent shown in the examples are the preferred amounts under the conditions specified.

In carrying out our elution procedure, charcoal containing adsorbed active material is preferably first mixed and thoroughly agitated with the selected organic solvent using an amount of solvent sufficient to provide a slurry, i. e., generally about 0.4–0.5 gallons of solvent per pound of dry charcoal (6.7–8.3 liters per kilogram of dry charcoal). After a period of agitation of the charcoal-organic solvent mixture, a quantity of water is added approximately equal to the volume of organic solvent employed and the resulting mixture is further agitated. The charcoal is then filtered off and washed with water saturated with solvent until the wash no longer is red or brown but has a yellow color. The filtrate and washes are combined and the solvent layer is separated from the aqueous layer containing vitamin $B_{12}$ and other active substances. The solvent thus separated can be recycled indefinitely, with a small amount of make-up to saturate the water phase, for the elution of additional charcoal adsorbates.

The aqueous layer thus obtained contains not only unusually large amounts of vitamin $B_{12}$, but also large amounts of other vitamin $B_{12}$-like substances having LLD and APF activity. It is important to note that the unusually high concentration of active substances in the aqueous solution resulting from our two-phase elution is directly attributable to the use of the two-phase eluting solvent. This is clearly evident from the fact that neither water alone, nor an organic polar solvent alone, is at all useful for the elution as little or no active substance is eluted. Apparently with the two-phase system, the polar solvent acts to replace the active substances present on the charcoal, and the water layer which is substantially free of solvent and has a high solvent power for the active substances readily takes up the substances as they are released from the charcoal.

The aqueous phase containing the vitamin $B_{12}$ active substances can be treated to precipitate the active substances by known methods, as for example saturation with ammonium sulfate, concentration, or precipitation with acetone or ether.

Preferably, however, the aqueous phase is extracted with an organic solvent in which the vitamin $B_{12}$ active substances are readily soluble. In effecting this extraction an inorganic salt such as ammonium sulfate, aluminum sulfate, sodium sulfate, sodium chloride, magnesium sulfate, calcium chloride or the like is added in an amount sufficient to saturate the aqueous solution and thereby force the active materials into the organic solvent. While any of a number of organic solvents, particularly the polar solvents described above, can be employed in this extraction, most satisfactory results have been obtained by extracting the aqueous phase with benzyl alcohol. This solvent extraction of active materials from the aqueous phase serves to effect a purification and also reduce the volume of the concentrate of active substances, or increase the relative concentration of the active substances in the solvent medium. To effect a further concentration of the active substances, the solvent solution can again be extracted with water, preferably accomplished by addition to the organic solvent of a second solvent such as chloroform which is miscible therewith but which has little solvent power for the active substances, this added solvent having the effect of forcing the active substances more completely into the aqueous phase. The new and more purified aqueous phase thus obtained can again be extracted with solvent such as benzyl alcohol in the manner previously described to obtain a more concentrated extract of the vitamin $B_{12}$ active substances.

After effecting one or more transfers of the active substances between water and organic solvent, such as benzyl alcohol, in the manner above described, the concentrate in organic solvent solution is preferably dried to remove traces of water that may be present and is placed on a chromatographic column of alumina. The column is then developed by washing with methanol and all effluent containing red coloration is collected as the rich cut of active material. If desired, the column can be washed before development with methanol, with a 1:2 mixture of methanol and acetone until the effluent is water-white, thereby removing a considerable amount of impurities without removing the LLD and APF active substances.

In this chromatographic purification, it is preferable to use benzyl alcohol as the solvent from which to adsorb active material on alumina. Benzyl alcohol gives up the active material near the top of the column and does not tend to wash the material down the column. This feature is most significant when chromatographing materials containing relatively large amounts of impurities. When the concentrates are of higher purity, other solvents can be effectively employed in further chromatographic purification.

The rich effluent from chromatography, i. e., the organic solvent solution of active substances, is preferably concentrated to small volume in vacuo, then treated with an agent such as ether to effect precipitation of the active substances. The resulting precipitate can be treated directly with hydrocyanic acid or an ionizable salt of hydrocyanic acid in the manner above described to convert the vitamin $B_{12}$-like materials to additional vitamin $B_{12}$. After removing any unreacted cyanide, as for example by heating to about 50–60° C. under acid conditions, the reaction mixture is further processed to obtain pure vitamin $B_{12}$. Various procedures are known for isolating pure vitamin $B_{12}$, and the present invention is not limited to the use of a particular recovery procedure. One very satisfactory procedure is to extract the vitamin $B_{12}$ into benzyl alcohol and purify it by countercurrent water-benzyl alcohol extraction in the manner fully disclosed and claimed in the pending application of our colleagues Brink and Wolf, Serial No. 120,352, filed October 8, 1949 issued on Aug. 19, 1952 as U. S. Patent No. 2,607,717.

Alternatively, the precipitate obtained after chromatography can be treated to recover therefrom a new crystalline complex of vitamin $B_{12}$ and the vitamin $B_{12}$-like materials. The precipitate is extracted with a suitable solvent such as methanol and the resulting solution is chromatographed on a column of adsorbent such as alumina. Methanol is preferably used to develop the column and to elute the active material, the effluent containing red coloration being collected as rich cut. Ether is added to the collected effluent to precipitate the active material which is then dissolved in water. Concentration of the aqueous solution or the addition of about 7 vol. of acetone causes crystallization of the new complex. This new complex is characterized by ultra-violet absorption maxima at about 3550 Å. and 5350 Å., by the presence of about 30% of material having a distribution coefficient of 1.2 for the system water/benzyl alcohol, by the presence of about 30% of material having a distribution coefficient of 7 for the system water/carbon tetrachloride-cresol (4–1), by the presence of about 25% of material having a distribution coefficient of 0.2 for the system water/carbon tetrachloride-cresol (5–2), and by the presence of about 35% of material having a distribution coefficient of 0.1 for the system water/carbon tetrachloride-cresol (6–1).

The following examples show how procedures in accordance with the present invention can be carried out, but it is to be understood that they are given by way of illustration and not of limitation.

Example 1

Fermentation broth obtained from the elaboration of a strain of *S. griseus* was given a preliminary clarification treatment with diatomaceous earth followed by filtration and was then slurried with about 4.8 gm. per liter of activated charcoal. The charcoal was removed and air-dried to 67% solids. The charcoal was ground and divided into a number of portions. Each portion was agitated for 30 minutes with the same volume of a different solvent or solvent mixture, the charcoal was removed and washed with water, and the water layer was separated and assayed for LLD activity. The following results were obtained:

| Solvent | Method of Separating Waterlayer* | LLD Activity, U. Gm. of Charcoal |
|---|---|---|
| Carbon tetrachloride-water, 1:1 | 1 | <40,000 |
| Benzene-water, 1:1 | 1 | <40,000 |
| Petroleum ether (30–60°)-water, 1:1 | 1 | <40,000 |
| Methanol-water, 1:1 | 2 | <40,000 |
| Methanol | 2 | <40,000 |
| Ethanol-water, 1:1 | 2 | 60,000 |
| Ethanol | 2 | <40,000 |
| n-Butanol-water, 1:1 | 1 | 400,000 |
| s-Butanol-water, 1:1 | 1 | 470,000 |
| i-Amyl alcohol (2-methyl-butanol-4)-water, 1:1 | 1 | 330,000 |
| Benzyl alcohol-water, 1:1 | 3 | 440,000 |
| 2-Octanol-water, 1:1 | 1 | 280,000 |
| Methyl ethyl ketone-water, 1:1 | 4 | 500,000 |
| Methyl isobutyl ketone-water, 1:1 | 1 | 250,000 |
| Cresol (mixture of isomers)-water, 1:1 | 5 | 150,000 |
| Amyl acetate (mixture of isomers)-water, 1:1 | 1 | 200,000 |
| 1-Hexanol-water, 1:1 | 1 | 440,000 |

*1. Solvent separated on standing and water layers sampled for assay.
2. Solvent removed by evaporation and remaining aqueous solutions sampled for assay.
3. Chloroform added and water layer sampled for assay.
4. Solvent removed by extraction with ether and water layer sampled for assay.
5. Carbon tetrachloride added and water layer sampled for assay.

Example 2

Fermentation broth obtained from the elaboration of a strain of *S. griseus* was given a preliminary clarification treatment with diatomaceous earth followed by filtration. Three portions of the broth were taken, and each portion was slurried with 5 gm. per liter of activated charcoal for 15 minutes. Each mixture was filtered, the cakes were washed with water, and air was drawn through the cakes for 15 minutes. Each cake was slurried 15 minutes with a 1.2:1 mixture of water and either n-butanol, s-butanol, or benzyl alcohol. The charcoal was removed by centrifugation in each case, and the cakes were washed with water. Aliquots of the combined filtrates and washings were assayed for LLD activity.

The water layers were separated, saturated with ammonium sulfate, and extracted several times with benzyl alcohol. Each benzyl alcohol solution was chromatographed on activated alumina, and the columns were developed with methanol. The rich effluents containing red coloration were treated with ether to effect precipitation. The precipitates were dissolved in water saturated with benzyl alcohol, and the optical densities were measured at 5500 Å. (one of the characteristic absorption maxima of vitamin $B_{12}$) and compared with the values for pure vitamin $B_{12}$. The readings represent the color due to vitamin $B_{12}$ plus that due to $B_{12}$-like materials present.

The aqueous solutions were subjected to an 8-plate counter-current distribution between water and benzyl alcohol, and the optical densities of the contents of the fifth tubes were measured at 5500 Å. to determine the amount of vitamin $B_{12}$ present. (This counter-current distribution of vitamin $B_{12}$ is fully disclosed in the pending application of Wolf, Kaczka and Kuehl, Serial No. 127,519, filed November 15, 1949 (now abandoned) and continuation-in-part thereof Serial No. 179,392, filed August 14, 1950, now abandoned.) The results of the foregoing determinations were as follows:

| Solvent | Eluate LLD-Activity, Percent of Broth Activity | Total Color Calculated as mg. of Vitamin B12 per 1,000 Gals. Broth | Vitamin B12 Present, mg. per 1,000 Gals. Broth |
|---|---|---|---|
| n-Butanol-water | 98 | 268 | 68 |
| s-Butanol-water | 95 | 202 | 88 |
| Benzyl alcohol-water | 100 | 205 | 78 |

*Example 3*

About 2200 gals. of fermentation broth obtained from the elaboration of a strain of *S. griseus* and assaying 4630 u/ml. of LLD-activity was given a preliminary clarification treatment with diatomaceous earth followed by filtration and was then agitated with 88 lbs. of activated charcoal. The charcoal was removed by filtration.

To the damp charcoal was added 45 gals. of n-butanol and the mixture was agitated 15 minutes. To the mixture was added 35 gals. of water and 25 lbs. of filter aid, and the mixture was agitated 45 minutes. The solid was removed by centrifugation and then washed several times on the centrifuge with a total of about 40 gals. of water saturated with butanol. The filtrate and washings were combined, and the layers were separated. The water layer was filtered to remove carbon fines.

To the 85 gals. of filtered water layer obtained were added 13 gals. of benzyl alcohol and 425 lbs. of ammonium sulfate. The mixture was agitated 15 minutes and was then allowed to stand for 1 hr. The water layer was separated and re-extracted with 8.5 gals. of benzyl alcohol. The benzyl alcohol extracts were combined and dried over anhydrous sodium sulfate. The volume of the dried extracts was about 28 gals.

The benzyl alcohol solution was then chromatographed on 20 kg. of activated alumina. When the entire solution had been fed to the column, the column was washed with a 1:2 mixture of methanol and acetone until the effluent was water-white. The column was then developed with methanol, collecting all the effluent containing red coloration as rich cut. 52 liters of rich cut were obtained.

The rich effluent was concentrated in vacuo, below 35° C., to about 2 liters and precipitated by the addition of one volume of acetone and 4 volumes of ether. The precipitate was removed by filtration and dried in vacuo at room temperature. A reddish-brown amorphous precipitate was obtained which was found to contain about ⅔% vitamin B12.

The dried precipitate was extracted portionwise with methanol until a white residue remained. One-half of the methanolic solution obtained was chromatographed on activated alumina, and the column was developed with methanol. All the effluent containing red coloration was collected as rich cut. The rich effluent was treated with four volumes of ether to effect precipitation. The precipitate was removed by filtration and dried in vacuo at room temperature. The dried precipitate was dissolved in a minimum amount of water, and acetone was added until the solution became turbid. The solution was allowed to stand, and crystallization occurred. The crystals were removed by centrifugation and dried in vacuo at room temperature. There was obtained 139 mg. of red-colored crystals, λ max. 3550 Å., $$E^{1\%}_{1 cm.} = 130$$

and 5350 Å.

$$E^{1\%}_{1 cm.} = 48$$

By employing an eight-plate counter-current distribution, there was found to be about 30% of material having a distribution coefficient of 1.2 for the system water/benzyl alcohol. By employing a three-plate counter-current distribution, there was found to be about 33% of material having a distribution coefficient of 7 for the system water/carbon tetrachloride-cresol (4-1), about 25% of material having a distribution coefficient of 0.2 for the system water/carbon tetrachloride-cresol (5-2), and about 37% of material having a distribution coefficient of 0.1 for the system water/carbon tetrachloride-cresol (6-1).

The foregoing data is believed to indicate that the new complex is made up of approximately one part of vitamin B12 and two parts of vitamin B12-like substances. As further evidence that this is the case, it should be noted that upon reacting a quantity (100 mg.) of the crystalline complex with a source of cyanide ion supplied, for example, by an excess, i. e., about 100 mg., of hydrocyanic acid and after removal of un-reacted cyanide, treating the reaction mixture to recover pure vitamin B12 therefrom, the amount of pure vitamin B12 obtained is about 100 mg. The substantially quantitative conversion of the complex to pure vitamin B12 by reaction with cyanide ion further indicates that the new complex is probably made up of one mole of vitamin B12 and two moles of material differing from vitamin B12 by a deficiency of one or more cyanide radicals.

Various changes and modifications in the foregoing procedures will occur to those skilled in the art and to the extent that such changes and modifications are embraced by the appended claims, it is to be understood that they constitute part of our invention.

We claim:

1. The process that comprises eluting charcoal, having adsorbed thereon vitamin B12 active substances associated with impurities, with a two-phase system of water and an organic polar solvent incompletely miscible with water, and separating the two phases of the resulting elute to recover an aqueous solution containing said vitamin B12 active substances essentially free of said impurities.

2. The process that comprises eluting charcoal, having adsorbed thereon vitamin B12 active substances associated with impurities, with a two-phase system of water and an organic polar solvent selected from the group which consists of alcohols, esters and ketones that are incompletely miscible with water, and separating the two phases of the resulting eluate to recover an aqueous solution containing said vitamin B12 active substances essentially free of said impurities.

3. The process that comprises eluting charcoal, having adsorbed thereon vitamin B12 active substances associated with impurities, with a two-phase system of water and an alkyl alcohol containing 4 to 8 carbon atoms that is incompletely miscible with water, and separating the two phases of the resulting eluate to recover an aqueous solution containing said vitamin $B_{12}$ active substances essentially free of said impurities.

4. The process that comprises eluting charcoal, having adsorbed thereon vitamin $B_{12}$ active substances associated with impurities, with a two-phase system of water and a butyl alcohol, and separating the two phases of the resulting eluate to recover an aqueous solution containing said vitamin $B_{12}$ active substances essentially free of said impurities.

5. The process that comprises eluting charcoal, having adsorbed thereon vitamin $B_{12}$ active substances associated with impurities, with a two-phase system of water and an amyl alcohol, and separating the two phases of the resulting eluate to recover an aqueous solution containing said vitamin $B_{12}$ active substances essentially free of said impurities.

6. The process that comprises eluting charcoal, having adsorbed thereon vitamin $B_{12}$ active substances associated with impurities, with a two-phase system of water and n-butyl alcohol, and separating the two phases of the resulting eluate to recover an aqueous solution containing said vitamin $B_{12}$ active substances essentially free of said impurities.

7. The process that comprises eluting charcoal, having adsorbed thereon vitamin $B_{12}$ active substances associated with impurities, with a two-phase system of water and s-butyl alcohol, and separating the two phases of the resulting eluate to recover an aqueous solution containing said vitamin $B_{12}$ active substances essentially free of said impurities.

8. The process that comprises eluting charcoal, having adsorbed thereon vitamin $B_{12}$ active substances associated with impurities, with a two-phase system of water and benzyl alcohol, and separating the two phases of the resulting eluate to recover an aqueous solution containing said vitamin $B_{12}$ active substances essentially free of said impurities.

9. The process that comprises eluting charcoal, having adsorbed thereon vitamin $B_{12}$ active substances associated with impurities, with a two-phase system of water and methyl ethyl ketone, and separating the two phases of the resulting eluate to recover an aqueous solution containing said vitamin $B_{12}$ active substances essentially free of said impurities.

STANFORD W. BRIGGS.
ROBERT G. DENKEWALTER.
GEORGE B. HUGHEY.

References Cited in the file of this patent

UNITED STATES PATENTS

| Number | Name | Date |
|---|---|---|
| 2,530,416 | Wolf | Nov. 21, 1950 |
| 2,563,794 | Rickes | Aug. 7, 1951 |
| 2,595,159 | Meyer | Apr. 29, 1952 |
| 2,609,325 | Brink | Sept. 2, 1952 |

FOREIGN PATENTS

| Number | Country | Date |
|---|---|---|
| 590,956 | Great Britain | Aug. 1, 1947 |

OTHER REFERENCES

Smith, Proceedings of the Biochemical Society, pages VIII and IX in Biochemical Journal, volume 43 (Number 1) 1949.

Rickes, Science, volume 107, April 16, 1948, page 396.

Rickes, Science, volume 108, December 3, 1948, pages 634, 635.

Ellis, Journal of Pharmacy and Pharmacology, volume 1, pages 60 and 61, January 1949.

Williams, An Introduction to Chromatography (1946), pages 64 and 65.

Smith, Nature, volume 161, pages 638, 639, April 24, 1948.